United States Patent
Li et al.

(10) Patent No.: US 10,868,832 B2
(45) Date of Patent: Dec. 15, 2020

(54) SYSTEMS AND METHODS FOR ENFORCING DYNAMIC NETWORK SECURITY POLICIES

(71) Applicant: CA, INC., San Jose, CA (US)

(72) Inventors: Qing Li, Cupertino, CA (US); Joseph Chen, Manhattan Beach, CA (US); Torrey Umland, Torrance, CA (US); Min Hao Chen, Milpitas, CA (US)

(73) Assignee: CA, INC., San Jose, CA (US)

( * ) Notice: Subject to any disclaimer, the term of this patent is extended or adjusted under 35 U.S.C. 154(b) by 392 days.

(21) Appl. No.: 15/465,636

(22) Filed: Mar. 22, 2017

(65) Prior Publication Data

US 2018/0278648 A1    Sep. 27, 2018

(51) Int. Cl.
    *H04L 29/06*    (2006.01)
    *G06F 21/55*    (2013.01)

(52) U.S. Cl.
    CPC ............ *H04L 63/20* (2013.01); *G06F 21/552* (2013.01); *G06F 21/554* (2013.01); *H04L 63/101* (2013.01); *H04L 63/104* (2013.01); *H04L 63/1416* (2013.01); *H04L 63/1425* (2013.01)

(58) Field of Classification Search
    CPC ... H04L 63/20; H04L 63/1416; H04L 63/104; H04L 63/101; H04L 63/1425; G06F 21/554; G06F 21/552
    See application file for complete search history.

(56) References Cited

U.S. PATENT DOCUMENTS

| | | | |
|---|---|---|---|
| 6,484,203 B1 | 11/2002 | Porras et al. | |
| 8,627,438 B1 * | 1/2014 | Bhimanaik | H04L 63/10 726/9 |
| 8,789,174 B1 | 7/2014 | Gupta | |
| 2006/0130141 A1 | 6/2006 | Kramer et al. | |
| 2006/0193300 A1 * | 8/2006 | Rawat | H04W 12/1204 370/338 |
| 2009/0177675 A1 * | 7/2009 | Trumbull | H04L 63/102 |

(Continued)

FOREIGN PATENT DOCUMENTS

CN    110521179 A    11/2019

OTHER PUBLICATIONS

TECH98211; Best Practices for Symantec Endpoint Protection Location Awareness; Nov. 20, 2014; http://www.symantec.com/docs/TECH98211.
TECH97369; More about Location Awareness in Symantec Endpoint Protection (SEP); Mar. 20, 2017; http://www.symantec.com/docs/TECH97369.

(Continued)

*Primary Examiner* — Nelson S. Giddins
(74) *Attorney, Agent, or Firm* — FisherBroyles, LLP

(57) ABSTRACT

A computer-implemented method for enforcing dynamic network security policies may include (i) monitoring, by a network traffic protection system, network packets transmitted on a network segment, (ii) detecting, by the network traffic protection system, a suspicious transmission of at least one network packet associated with an endpoint computing device connected to the network segment, (iii) modifying, based on the suspicious transmission of the network packet, at least one network security policy for the network segment, and (iv) enforcing, by the network traffic protection system, the modified network security policy for all endpoint computing devices connected to the network segment. Various other methods, systems, and computer-readable media are also disclosed.

20 Claims, 10 Drawing Sheets

(56) References Cited

U.S. PATENT DOCUMENTS

| | | | |
|---|---|---|---|
| 2012/0137367 A1 | 5/2012 | Dupont et al. | |
| 2014/0053265 A1* | 2/2014 | Crowley | H04L 67/303 726/22 |
| 2014/0283004 A1 | 9/2014 | Moore | |
| 2015/0188949 A1* | 7/2015 | Mahaffey | H04W 12/0027 726/1 |
| 2015/0372980 A1 | 12/2015 | Eyada | |
| 2015/0381660 A1* | 12/2015 | Hsiung | H04L 41/0893 726/1 |
| 2016/0191549 A1 | 6/2016 | Nguyen et al. | |
| 2016/0261482 A1 | 9/2016 | Mixer et al. | |
| 2016/0269442 A1 | 9/2016 | Shieh | |
| 2016/0344620 A1* | 11/2016 | G. Santos | H04L 45/745 |
| 2018/0048704 A1* | 2/2018 | Li | H04L 45/46 |
| 2018/0278648 A1 | 9/2018 | Li et al. | |

OTHER PUBLICATIONS

Symantec Endpoint Protection; https://en.wikipedia.org/wiki/Symantec_Endpoint_Protection, as accessed Mar. 20, 2017; Wikipedia.

Li et al., "Managing Data Encrypting Applications", U.S. Appl. No. 15,446/956, filed Mar. 1, 2017, 54 pages.

Roundy et al., "Systems and Methods for Dynamically Validating Remote Requests Within Enterprise Networks", U.S. Appl. No. 15/044,708, filed Feb. 16, 2016, 75 pages.

Li et al., "Systems and Methods for Network Protection of Endpoint Devices", U.S. Appl. No. 15/467,221, filed Mar. 23, 2017, 63 pages.

International Search Report and Written Opinion received for PCT Application Serial No. PCT/US2018/023194 dated Jul. 24, 2018, 15 pages.

International Preliminary Report on Patentability received for PCT Application Serial No. PCT/US2018/023194 dated Oct. 3, 2019, 12 pages.

* cited by examiner

SYSTEMS AND METHODS FOR ENFORCING DYNAMIC NETWORK SECURITY POLICIES

BACKGROUND

Network computing systems, particularly for organizations or enterprises, often require strict network security to prevent malicious attacks from spreading within a network. For example, a single computing device infected with malware and connected to a trusted network may create security vulnerabilities for other devices on the same network. Traditionally, network managers and various software may be used to provide oversight of security for a network or network segment. These managers may monitor activity on the network and enforce security policies through control of network traffic to and from endpoint devices.

However, network managers may not always be able to update security policies in a timely manner. For example, security policies may not account for sudden changes in endpoint device configurations or the appearance of unexpected traffic. In addition, individual endpoint devices on a network may have their own specific security requirements or policies that may be incompatible with the network manager's security policies. Furthermore, different network segments within an organization may require different policies, and endpoint devices may not comply with each of these different policies. For example, a financial department's network may have more stringent policies than a customer service department's network. An employee's endpoint device that moves from the customer service network to the financial network may suddenly be non-compliant with the new network segment's policies. The instant disclosure, therefore, identifies and addresses a need for systems and methods for enforcing dynamic network security policies.

SUMMARY

As will be described in greater detail below, the instant disclosure describes various systems and methods for enforcing dynamic network security policies. In one example, a computer-implemented method for enforcing dynamic network security policies may include (i) monitoring, by a network traffic protection system, network packets transmitted on a network segment, (ii) detecting, by the network traffic protection system, a suspicious transmission of at least one network packet associated with an endpoint computing device connected to the network segment, (iii) modifying, based on the suspicious transmission of the network packet, at least one network security policy for the network segment, and (iv) enforcing, by the network traffic protection system, the modified network security policy for all endpoint computing devices connected to the network segment.

In one embodiment, the endpoint computing device may include a computing device running software capable of pairing with the network traffic protection system while connected to the network segment.

In some examples, detecting the suspicious transmission of the network packet may include intercepting the network packet. In these examples, detecting the suspicious transmission of the network packet may also include determining, based on an expected network traffic profile of the endpoint computing device, that the transmission of the network packet is suspicious.

In some embodiments, modifying the network security policy for the network segment may include blocking the endpoint computing device and/or restricting network traffic. Additionally or alternatively, modifying the network security policy may include adding the endpoint computing device to a blacklist of devices and/or preventing the suspicious transmission of the network packet from completing.

In one example, enforcing the modified network security policy may include pushing the modified network security policy to the endpoint computing devices connected to the network segment and/or ensuring network traffic follows the modified network security policy. Additionally or alternatively, enforcing the modified network security policy may include restricting a non-compliant endpoint computing device connected to the network segment.

In some embodiments, the computer-implemented method may further include sending the modified network security policy to a related network traffic protection system that monitors a related network segment. In these embodiments, the related network segment may include a second network segment within a cluster of network segments containing the network segment.

In one example, the computer-implemented method may further include identifying at least one software application related to the suspicious transmission of the network packet, requesting additional information about the software application from the endpoint computing device, and performing a security action based on the additional information. In this example, the security action may include detecting user tampering of the endpoint computing device, detecting an anomaly in installation of the software application, determining the software application may be malicious, requesting a log of user activity for the software application, and/or restricting the endpoint computing device.

In one embodiment, a system for implementing the above-described method may include (i) a monitoring module, stored in memory, that monitors, by a network traffic protection system, network packets transmitted on a network segment, (ii) a detection module, stored in memory, that detects, by the network traffic protection system, a suspicious transmission of at least one network packet associated with an endpoint computing device connected to the network segment, (iii) a modification module, stored in memory, that modifies, based on the suspicious transmission of the network packet, at least one network security policy for the network segment, and (iv) an enforcement module, stored in memory, that enforces, by the network traffic protection system, the modified network security policy for all endpoint computing devices connected to the network segment. In addition, the system may include at least one processor that executes the monitoring module, the detection module, the modification module, and the enforcement module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor, by a network traffic protection system, network packets transmitted on a network segment, (ii) detect, by the network traffic protection system, a suspicious transmission of at least one network packet associated with an endpoint computing device connected to the network segment, (iii) modify, based on the suspicious transmission of the network packet, at least one network security policy for the network segment, and (iv) enforce, by the network traffic protection system, the modified network security policy for all endpoint computing devices connected to the network segment.

In one example, an additional computer-implemented method for enforcing dynamic network security policies may include (i) detecting, by a network security agent, an attempt by an endpoint computing device to connect to a network, (ii) attempting, by the network security agent, to pair with a network traffic protection system managing the network, (iii) receiving, based on the attempt to pair with the network traffic protection system, a set of network security policies for the network, (iv) modifying an original set of security policies for the endpoint computing device to comply with the received set of network security policies for the network, and (v) completing the attempt to connect to the network. In this example, the additional computer-implemented method may further include offloading a security function to the paired network traffic protection system.

In some embodiments, attempting to pair with the network traffic protection system may include performing a mutual authentication process between the network security agent and the network traffic protection system.

In one example, the set of network security policies may include a user-specific policy for a user of the endpoint computing device and/or a network-specific policy for the network. Additionally or alternatively, the set of network security policies may include a default policy for the endpoint computing device.

In one embodiment, modifying the original set of security policies may include replacing the original set of security policies with the received set of network security policies and/or adding the received set of network security policies to the original set of security policies. Additionally or alternatively, modifying the original set of security policies may include revising a portion of the original set of security policies to comply with the received set of network security policies.

In some examples, the additional computer-implemented method may further include receiving, from the network traffic protection system, at least one location attribute of the network. In these examples, the location attribute of the network may include a physical location of the network and/or a type of network. In these examples, the additional computer-implemented method may also include calculating, based on the location attribute of the network and the attempt to pair with the network traffic protection system, a trustworthiness of the network and modifying, based on the calculated trustworthiness of the network, at least one security policy for the endpoint computing device.

In some embodiments, the additional computer-implemented method may further include detecting, by the network security agent, a disconnect from the network. In these embodiments, the additional computer-implemented method may include reapplying the original set of security policies for the endpoint computing device.

In one example, an additional system for enforcing dynamic network security policies may include a network computing device configured to (i) monitor, by a network traffic protection system, network packets transmitted on a network segment, (ii) detect, by the network traffic protection system, a suspicious transmission of at least one network packet associated with an endpoint computing device connected to the network segment, (iii) modify, based on the suspicious transmission of the network packet, at least one network security policy for the network segment, and (iv) enforce, by the network traffic protection system, the modified network security policy for all endpoint computing devices connected to the network segment. In addition, the endpoint computing device may be configured to (i) detect, by a network security agent, an attempt by the endpoint computing device to connect to the network segment, (ii) attempt, by the network security agent, to pair with the network traffic protection system managing the network segment, (iii) receive, based on the attempt to pair with the network traffic protection system, a set of network security policies for the network segment, (iv) modify an original set of security policies for the endpoint computing device to comply with the received set of network security policies for the network segment, and (v) complete the attempt to connect to the network segment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
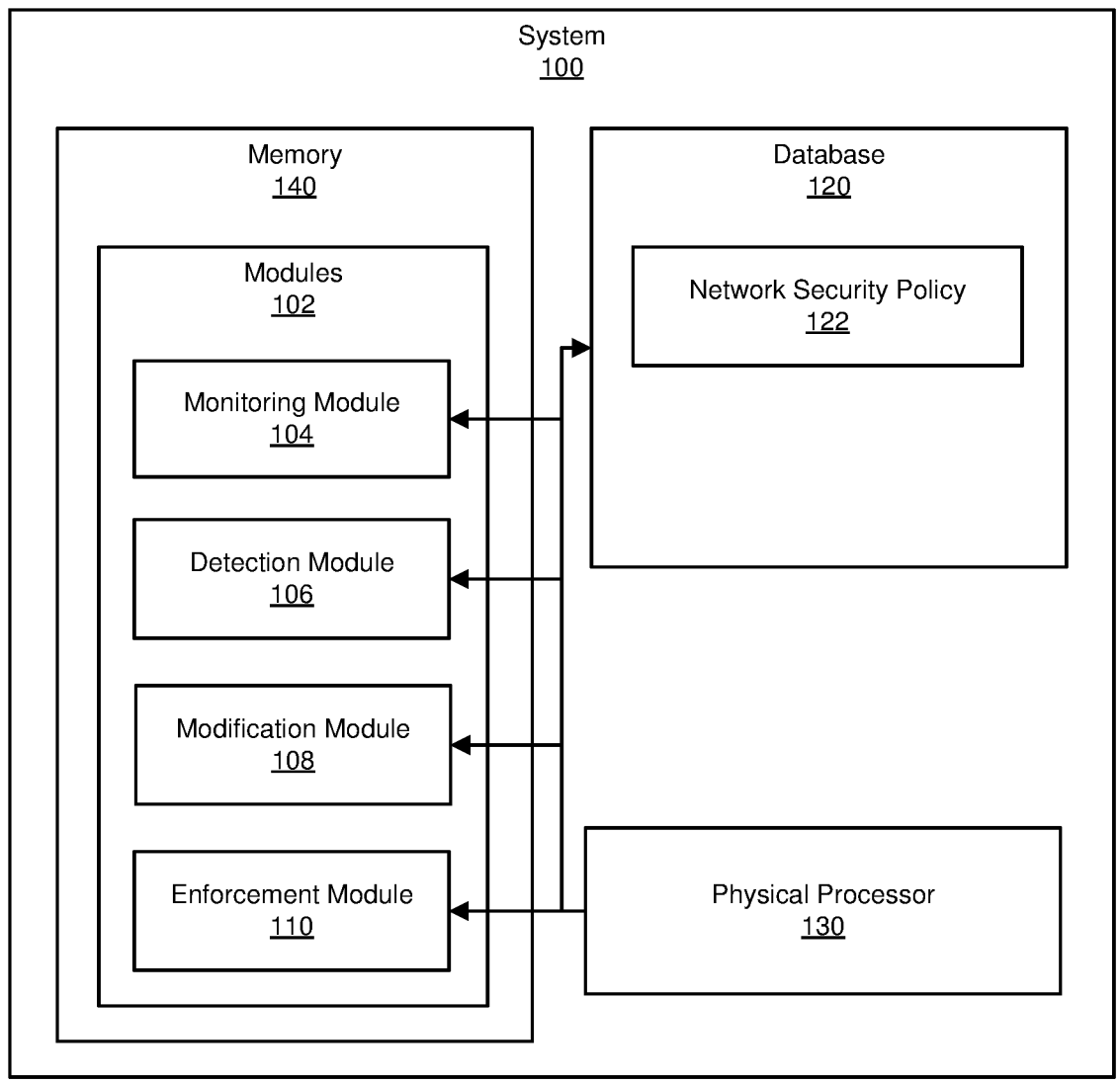
FIG. 1 is a block diagram of an example system for enforcing dynamic network security policies.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for enforcing dynamic network security policies. As will be explained in greater detail below, by monitoring and intercepting network traffic, the systems and methods described herein may enable dynamic adjustment of security policies in a network. For example, by comparing network traffic to an expected traffic profile for an endpoint device, the disclosed systems and methods may determine if traffic is suspicious for a specific device and enable detection of software compliance issues for the device. By pushing security policies to endpoint devices and blocking network traffic of non-compliant devices, the systems and methods described herein may then ensure network security for other devices on the same network.

Furthermore, by clustering related network segments, such as network segments within the same organization, the disclosed systems and methods may propagate security policies across segments or clusters in a hierarchical structure. In some examples, the systems and methods described herein may pair a network traffic protection system and an endpoint device, enabling the endpoint device to offload some network security responsibilities to the trusted network traffic protection system. The disclosed systems and methods may also enable the endpoint device to dynamically adjust local security policies based on the network or the type of network to which it connects.

In addition, the systems and methods described herein may improve the functioning of a computing device by enforcing compliance with network security policies when a device is connected to a network and ensuring the safety of network traffic. These systems and methods may also improve the fields of network security and endpoint security by mutually authenticating network managers and endpoint devices. Thus, these systems and methods may provide real-time, dynamic network security that automatically responds to network threats.

Figure 2:
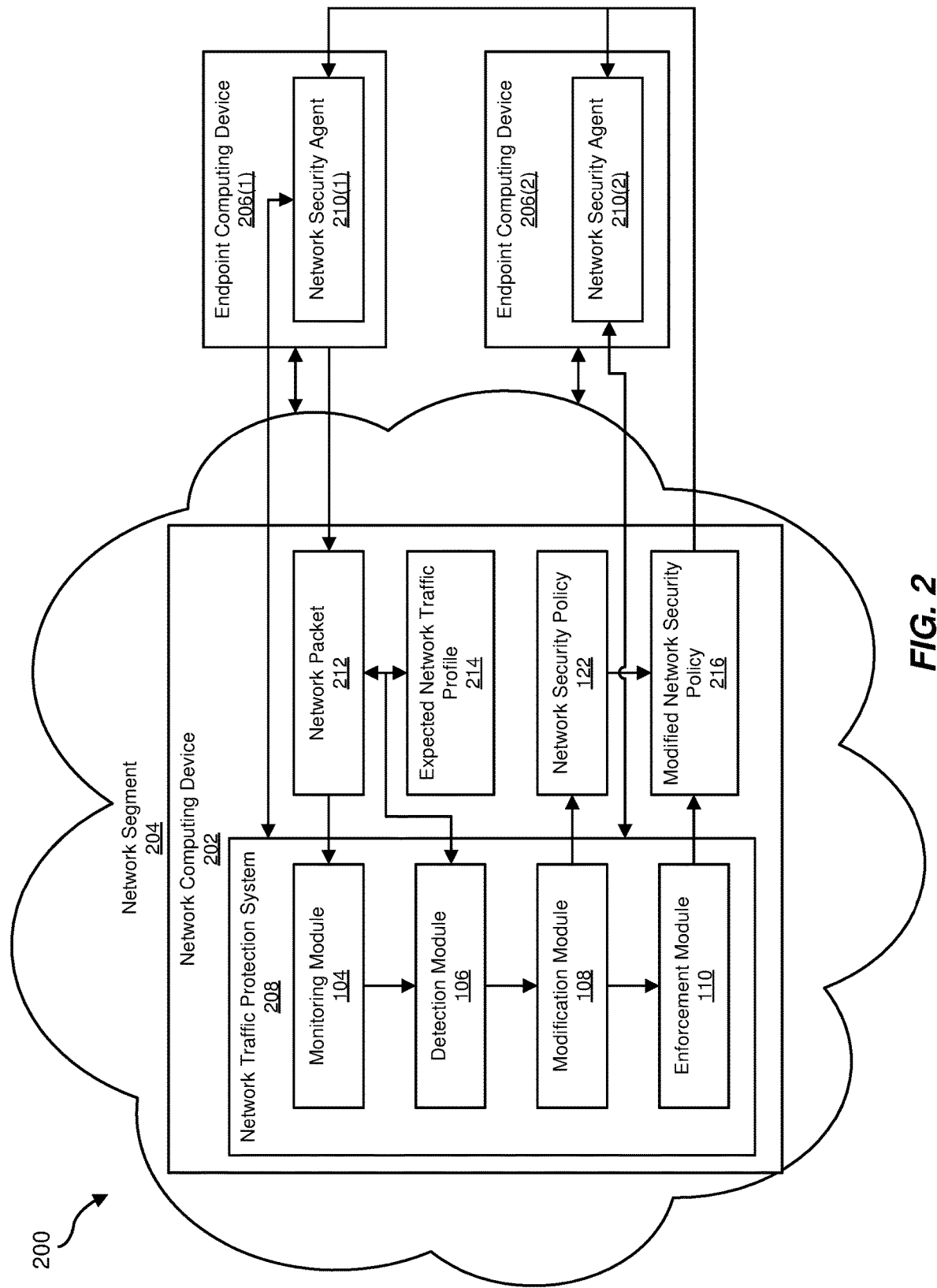
FIG. 2 is a block diagram of an additional example system for enforcing dynamic network security policies.

The following will provide, with reference to FIGS. 1 and 2, detailed descriptions of example systems for enforcing dynamic network security policies. Detailed descriptions of corresponding computer-implemented methods will also be provided in connection with FIG. 3. Detailed descriptions of an example propagation of a modified network security policy in an example cluster of network segments will be provided in connection with FIG. 4. Detailed descriptions of an example security action performed in response to detecting an example software application on an example endpoint computing device will also be provided in connection with FIG. 5. In addition, detailed descriptions of an example pairing between an example endpoint computing device and an example network will be provided in connection with FIG. 6. Furthermore, detailed descriptions of an example network trustworthiness calculated based on an example location attribute will be provided in connection with FIG. 7. Detailed descriptions of additional corresponding computer-implemented methods will be provided in connection with FIG. 8. Finally, detailed descriptions of an example computing system and network architecture capable of implementing one or more of the embodiments described herein will be provided in connection with FIGS. 9 and 10, respectively.

FIG. 1 is a block diagram of example system 100 for enforcing dynamic network security policies. As used herein, the term "security policy" generally refers to a set of rules or constraints for managing the security of a computing device or system. In particular, the term "network security policy," as used herein, generally refers to a security policy directed to the access or conduct of computing devices on a computer network.

As illustrated in FIG. 1, example system 100 may include one or more modules 102 for performing one or more tasks. For example, and as will be explained in greater detail below, modules 102 may include a monitoring module 104 that monitors, by a network traffic protection system, network packets transmitted on a network segment. The terms "network traffic protection system" and "network manager" as used herein, generally refer to a device or software used in traffic classification, bandwidth management, and policy enforcement, which may include methods to delay or prioritize network packets and/or traffic to ensure compliance with a desired network policy. The term "network packet," as used herein, generally refers to a unit of data that may be transmitted over a network. Furthermore, the term "network segment," as used herein, generally refers to a portion of a network that may be separated from other segments or the remaining network by physical or logical means.

Modules 102 in FIG. 1 may additionally include a detection module 106 that detects, by the network traffic protection system, a suspicious transmission of at least one network packet associated with an endpoint computing device connected to the network segment. Modules 102 may also include a modification module 108 that modifies, based on the suspicious transmission of the network packet, at least one network security policy for the network segment. Modules 102 may further include an enforcement module 110 that enforces, by the network traffic protection system, the modified network security policy for all endpoint computing devices connected to the network segment. Although illustrated as separate elements, one or more of modules 102 in FIG. 1 may represent portions of a single module or application or multiple modules or applications.

In certain embodiments, one or more of modules 1002 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., network computing device 202). One or more of modules 102 in FIG. 1 may also represent all or portions of one or more special-purpose computers configured to perform one or more tasks. Although illustrated as part of network computing device 202 in FIG. 2, one or more of modules 102 in FIG. 1 may be executed by a separate network manager device (e.g., network traffic protection system 208 in FIG. 2) to manage network computing device 202 and/or a network (e.g., network segment 204 in FIG. 2 and/or network 602 in FIG. 6).

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate enforcing dynamic network security policies. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a network security policy 122, which may include one or more rules for securing a network and/or a network segment. Database 120 may represent portions of a single database or computing device or a plurality of databases or computing devices. For example, database 120 may represent a portion of network computing device 202 in FIG. 2. Alternatively, database 120 in FIG. 1 may represent one or more physically separate devices capable of being accessed by a computing device, such as network computing device 202, endpoint computing device 206(1), and/or endpoint computing device 206(2) in FIG. 2. For example, database 120 may reside on network segment 204 and be accessed by network computing device 202. As another example, database 120 may be external storage, such as cloud storage, that may be accessed by network managers like network computing device 202 through network segment 204 or another network connection.

Example system 100 in FIG. 1 may be implemented in a variety of ways. For example, all or a portion of example system 100 may represent portions of example system 200 in FIG. 2. As shown in FIG. 2, system 200 may include an endpoint computing device 206(1) and an endpoint computing device 206(2) in communication with a network computing device 202 via a network segment 204. In one example, all or a portion of the functionality of modules 102 may be performed by network computing device 202, network traffic protection system 208, and/or any other suitable computing system.

As will be described in greater detail below, one or more of modules 102 from FIG. 1 may, when executed by at least one processor of network computing device 202, enable network computing device 202 to secure endpoint devices on a network. For example, and as will be described in greater detail below, monitoring module 104 may monitor, by a network traffic protection system 208, network packets transmitted on network segment 204. Detection module 106 may detect, by network traffic protection system 208, a suspicious transmission of a network packet 212 associated with endpoint computing device 206(1) connected to network segment 204. Modification module 108 may modify, based on the suspicious transmission of network packet 212, network security policy 122 for network segment 204. Enforcement module 110 may enforce a modified network security policy 216 for all endpoint computing devices connected to network segment 204.

In the example of FIG. 2, and as will be explained in greater detail below, network computing device 202 may have network manager software, such as network traffic protection system 208, installed. Network computing device 202 may use network traffic protection system 208 to monitor network traffic for endpoint computing devices 206(1) and 206(2), which are paired with network traffic protection system 208 using a network security agent 210(1) and a network security agent 210(2), respectively. The term "network security agent," as used herein, generally refers to software that helps manage or control network security for a specific device.

Network computing device 202 in FIG. 2 may then detect network packet 212, transmitted by endpoint computing device 206(1), and determine network packet 212 is suspicious. Next, network computing device 202 may modify network security policy 122 to become modified network security policy 216 in response to detecting suspicious network packet 212. Finally, network computing device 202 may enforce modified network security policy 216 by pushing modified network security policy 216 to endpoint computing devices 206(1) and 206(2).

Network computing device 202 in FIG. 2 generally represents any type or form of computing device capable of managing a computer network. For example, network computing device 202 may represent an inline network device running network traffic protection system software. Additional examples of network computing device 202 include, without limitation, modems, routers, network bridges, network gateways, switches, network hubs, traffic shaping devices, and/or other devices that provide network traffic monitoring and/or network security services. Although illustrated as a single entity in FIG. 2, network computing device 202 may include and/or represent a plurality of devices that work and/or operate in conjunction with one another.

Endpoint computing devices 206(1) and 206(2) generally represent any type or form of computing device capable of reading computer-executable instructions. For example, endpoint computing devices 206(1) and 206(2) may represent endpoint devices running network security agent software. Additional examples of endpoint computing devices 206(1) and 206(2) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Figure 6:
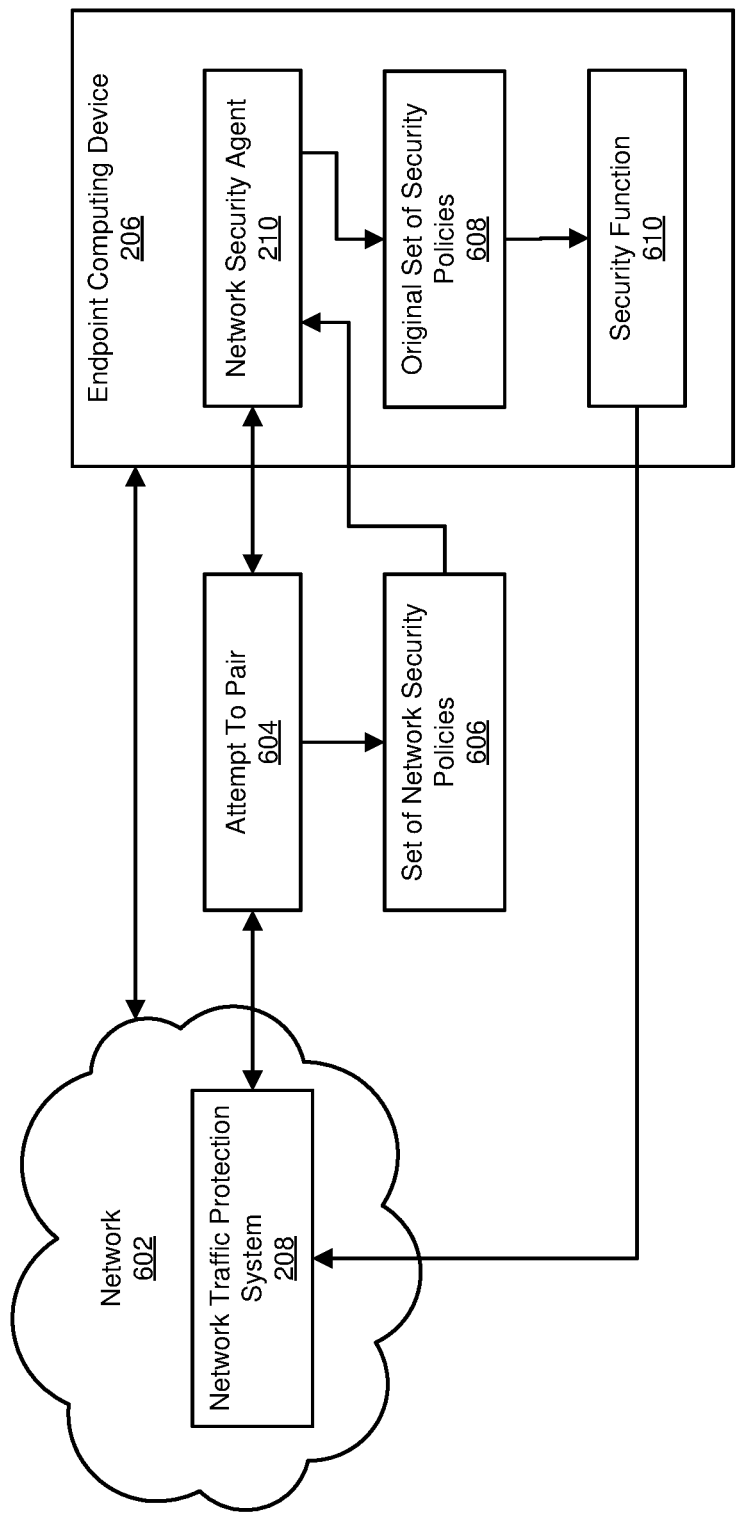
FIG. 6 is a block diagram of an example pairing between an example endpoint computing device and an example network.

Network segment 204 in FIG. 2 and network 602 in FIG. 6 generally represent any medium or architecture capable of facilitating communication or data transfer. In one example, network segment 204 and/or network 602 may facilitate communication between network computing device 202 and endpoint computing devices 206(1) and 206(2). In this example, network segment 204 and/or network 602 may facilitate communication or data transfer using wireless and/or wired connections. Examples of network segment 204 and/or network 602 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
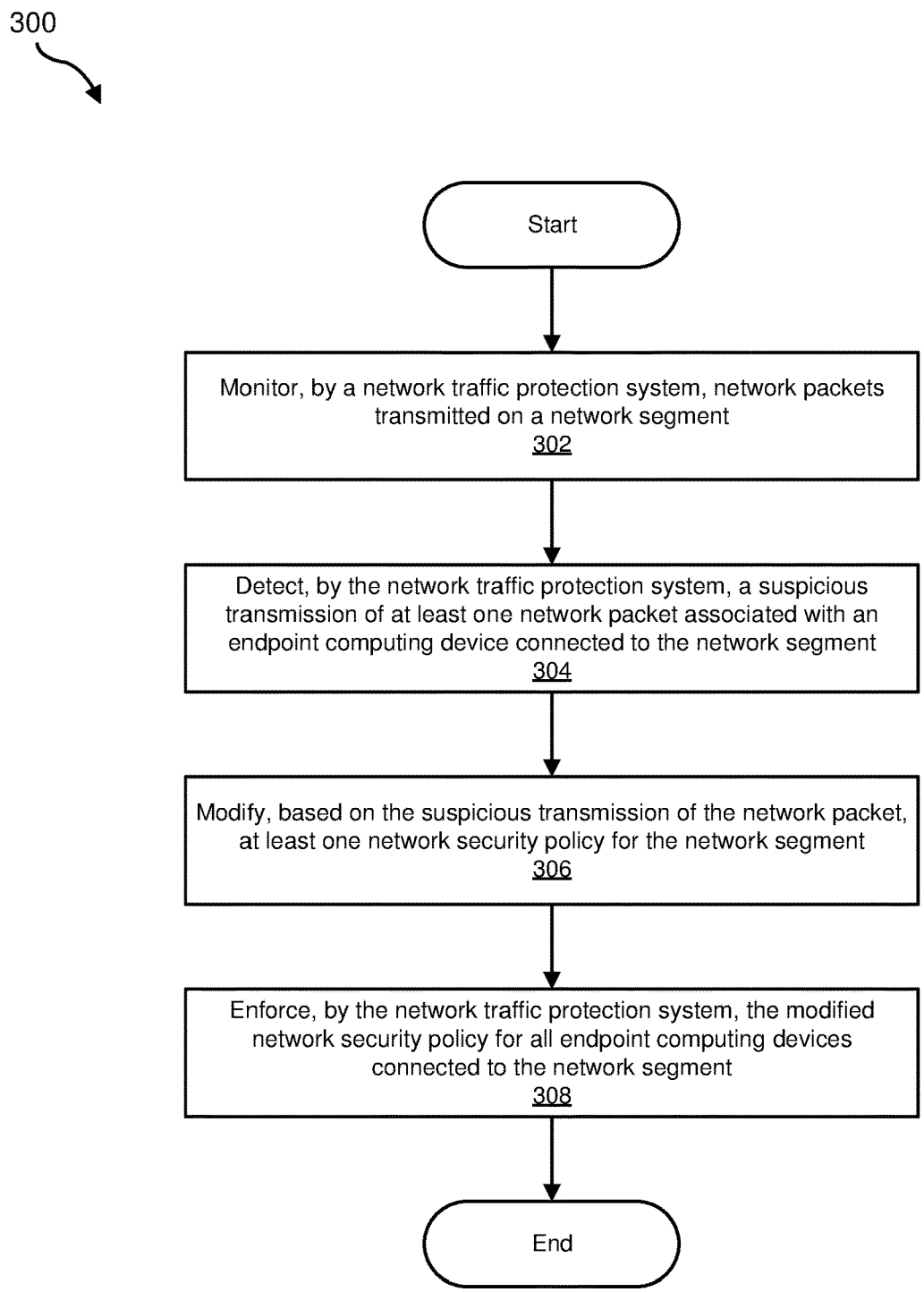
FIG. 3 is a flow diagram of an example method for enforcing dynamic network security policies.

FIG. 3 is a flow diagram of an example computer-implemented method 300 for enforcing dynamic network security policies. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may monitor, by a network traffic protection system, network packets transmitted on a network segment. For example, monitoring module 104 may, as part of network computing device 202 in FIG. 2, monitor, by network traffic protection system 208, network packets transmitted on network segment 204.

Monitoring module 104 may monitor network packets in a variety of ways. In some examples, network computing device 202 may represent an inline network device that runs network traffic protection system 208 as part of network segment 204. In these examples, network computing device 202 may manage some or all of the security functions for network segment 204. In other examples, network computing device 202 may be a separate device connected to network segment 204 via a wired or wireless connection that remotely monitors network packets, such as client 1010 running system 100 in FIG. 10. Alternatively, network traffic protection system 208 may represent a distinct hardware device, rather than software running on network computing device 202, that specifically intercepts and/or manages network traffic.

Returning to FIG. 3, at step 304, one or more of the systems described herein may detect, by the network traffic protection system, a suspicious transmission of at least one network packet associated with an endpoint computing device connected to the network segment. For example, detection module 106 may, as part of network computing device 202 in FIG. 2, detect, by network traffic protection system 208, a suspicious transmission of a network packet 212 associated with an endpoint computing device 206(1) connected to network segment 204.

Detection module 106 may detect the suspicious transmission of network packet 212 in a variety of ways. In one embodiment, endpoint computing device 206(1) may run software capable of pairing with network traffic protection system 208 (e.g., network security agent 210(1)) while connected to network segment 204. The term "pair," as used herein, generally refers to a process of bonding two or more devices such that the devices may communicate. In this embodiment, network traffic protection system 208 may require all endpoint devices to pair with network computing device 202 upon connecting to network segment 204 so that network computing device 202 may manage network security for the endpoint devices. Devices that do not pair with network computing device 202 through network traffic protection system 208 may be blocked or otherwise restricted.

Figure 8:
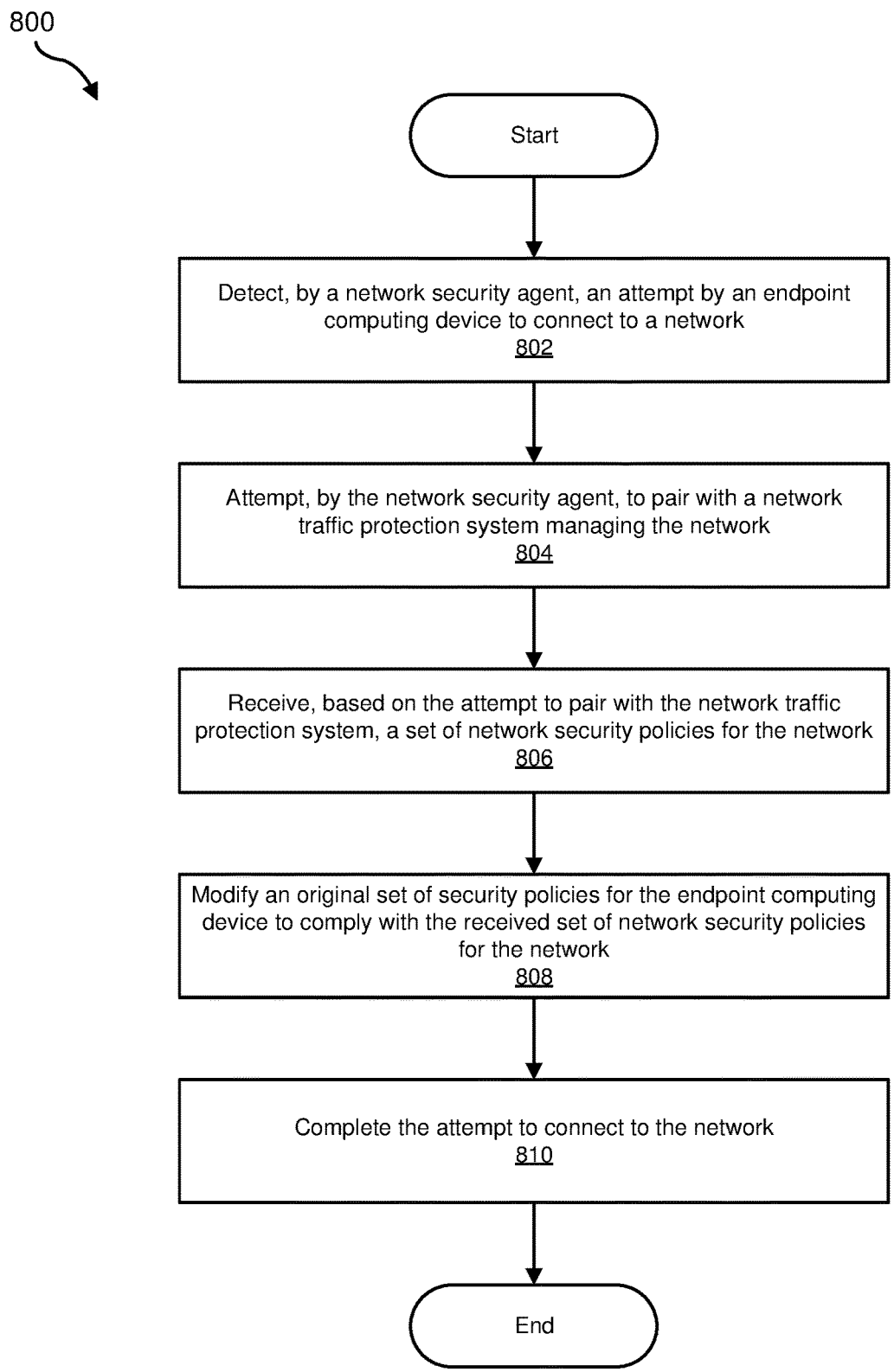
FIG. 8 is a flow diagram of an additional example method for enforcing dynamic network security policies.

FIG. 8 is a flow diagram of an additional example computer-implemented method 800 for enforcing dynamic network security policies. The steps shown in FIG. 8 may be performed by any suitable computer-executable code and/or computing system, including system 100 in FIG. 1, system 200 in FIG. 2, and/or variations or combinations of one or more of the same. In one example, each of the steps shown in FIG. 8 may represent an algorithm whose structure includes and/or is represented by multiple sub-steps, examples of which will be provided in greater detail below.

As illustrated in FIG. 8, at step 802, one or more of the systems described herein may detect, by a network security agent, an attempt by an endpoint computing device to connect to a network. At step 804, the systems described herein may attempt, by the network security agent, to pair with a network traffic protection system managing the network. Next, at step 806, the systems described herein may receive, based on the attempt to pair with the network traffic protection system, a set of network security policies for the network. At step 808, the systems described herein may then modify an original set of security policies for the endpoint computing device to comply with the received set of network security policies for the network. At step 810, the systems described herein may finally complete the attempt to connect to the network.

For example, as illustrated in FIG. 6, an endpoint computing device 206 may detect, by a network security agent 210, an attempt by endpoint computing device 206 to connect to a network 602. In this example, network 602 may represent a network or a network segment, such as network segment 204 in FIG. 2. Endpoint computing device 206 may then attempt, by network security agent 210, to pair with network traffic protection system 208 managing network 602 (e.g., attempt to pair 604). Endpoint computing device 206 may also receive, based on attempt to pair 604, a set of network security policies 606 for network 602. Next, endpoint computing device 206 may modify an original set of security policies 608 for endpoint computing device 206 to comply with set of network security policies 606. Finally, endpoint computing device 206 may complete the attempt to connect to network 602.

In the above example, attempt to pair 604 may include performing a mutual authentication process between network security agent 210 and network traffic protection system 208. The term "mutual authentication," as used herein, generally refers to a process in which two or more devices and/or computing systems authenticate or identify themselves to each other. Notably, a network security agent and a network traffic protection system may mutually authenticate an endpoint computing device and a network computing device, respectively.

In some embodiments, set of network security policies 606 may include a user-specific policy for a user of endpoint computing device 206, a network-specific policy for network 602, and/or a default policy for endpoint computing device 206. For example, if the mutual authentication identifies the user of endpoint computing device 206, network traffic protection system 208 may obtain the user-specific policy from a central database of user policies and/or another trusted network traffic protection system. In these embodiments, the network-specific policy may depend on the type of network or the type of information transmitted over network 602. The network-specific policy may be received from network traffic protection system 208 as a policy specific to network 602 or may be selected by network security agent 210 for network 602. In additional embodiments, network 602 may not be able to pair with endpoint computing device 206 and/or may not run a network traffic protection system. In these additional embodiments, endpoint computing device 206 may use the default policy for endpoint computing device 206, such as original set of security policies 608, while connected to network 602. For example, the default policy may include a stricter policy for unverified or unsecure networks. Alternatively, endpoint computing device 206 may retain a default policy that includes more security control than a network-specific policy.

In some examples, endpoint computing device 206 may modify original set of security policies 608 by replacing original set of security policies 608 with set of network security policies 606. Additionally or alternatively, endpoint computing device 206 may add set of network security policies 606 to original set of security policies 608. In other examples, endpoint computing device 206 may revise a portion of original set of security policies 608 to comply with set of network security policies 606. For example, network 602 may be a financial network that enforces security policies with more restrictions than original set of security policies 608. Endpoint computing device 206 may then modify original set of security policies 608 to increase security to match the restrictions of set of network security policies 606 for network 602.

Furthermore, as shown in FIG. 6, endpoint computing device 206 may offload a security function 610 to network traffic protection system 208 as a result of the pairing. The term "security function," as used herein, generally refers to an action taken to enforce or implement a security policy. In the above example, endpoint computing device 206 may enable network traffic protection system 208 to determine how and when to block traffic for financial websites, based on set of network security policies 606. As another example, network security agent 210 may determine that network 602 is a trusted network based on pairing with network traffic protection system 208 and, consequently, may trust network traffic protection system 208 to provide network security for endpoint computing device 206, thereby relinquishing control of security function 610.

In one embodiment, endpoint computing device 206 may receive, from network traffic protection system 208, one or more location attributes of network 602 prior to completing the attempt to connect to network 602. In this embodiment, the location attribute of network 602 may include a physical location of network 602 and/or a type of network. Additionally, endpoint computing device 206 may then calculate, based on the location attribute of network 602 and attempt to pair 604, a trustworthiness of network 602. Next, endpoint computing device 206 may modify, based on the calculated trustworthiness of network 602, one or more security policies for endpoint computing device 206, such as policies in set of network security policies 606 and/or original set of security policies 608.

Figure 7:
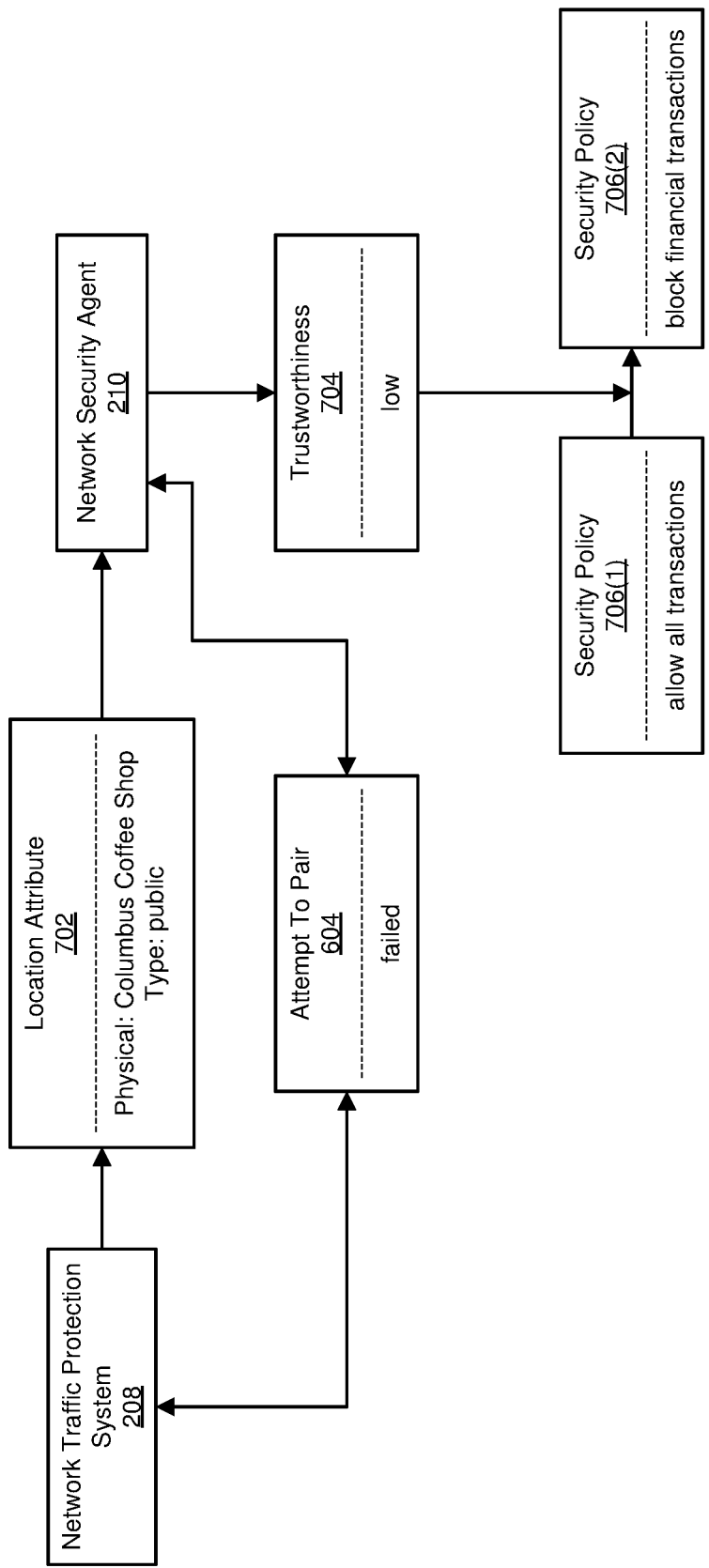
FIG. 7 is a block diagram of an example network trustworthiness calculated based on an example location attribute.

As illustrated in FIG. 7, network security agent 210 may receive a location attribute 702 with a physical location (e.g., "Columbus Coffee Shop") and a type of network (e.g., "public") from network traffic protection system 208. In this example, network security agent 210 may use location attribute 702 and attempt to pair 604 (e.g., "failed") to determine that a trustworthiness 704 of network 602 is low. Network security agent 210 may then modify a security policy 706(1), which allows all transactions by endpoint computing device 206 on network 602, to a security policy 706(2), which specifically blocks financial transactions on network 602.

In further examples, location attribute 702 may include information about whether network 602 is a trusted network. In the example of FIG. 7, a public, coffee shop network may be considered an untrusted network. Additionally, failed attempt to pair 604 may also indicate an untrustworthy network. In other examples, the ability to pair with network traffic protection system 208 may increase calculated trustworthiness 704. Security policy 706(2) may be more restrictive for an untrusted network and/or more lenient for a trusted network. Thus, endpoint computing devices may create and/or receive network security policies during an initial connection to a network, such as network 602 or network segment 204.

Returning to the example of FIG. 2, detection module 106 may detect the suspicious transmission of network packet 212 by intercepting network packet 212 and determining, based on an expected network traffic profile 214 of endpoint computing device 206(1), that the transmission of network packet 212 is suspicious. Expected network traffic profile 214 may be calculated in a variety of ways. In some embodiments, network traffic protection system 208 may use historical data on traffic associated with endpoint computing device 206(1) to calculate a standard behavior of endpoint computing device 206(1). Alternatively, network security agent 210(1) may track traffic for endpoint computing device 206(1) and send expected network traffic profile 214 to network traffic protection system 208. In another embodiment, network traffic protection system 208 may request and receive expected network traffic profile 214 from a central database of traffic profiles. For example, network traffic protection system 208 may query a company database of expectations and/or compliance requirements for all employee endpoint devices. In further embodiments, expected network traffic profile 214 for endpoint computing device 206(1) may be based on similar endpoint devices, such as endpoint computing device 206(2), that are known to be compliant.

Returning to FIG. 3, at step 306, one or more of the systems described herein may modify, based on the suspicious transmission of the network packet, at least one network security policy for the network segment. For example, modification module 108 may, as part of network computing device 202 in FIG. 2, modify, based on the suspicious transmission of network packet 212, a network security policy 122 for network segment 204.

Modification module 108 may modify network security policy 122 in a variety of ways. In some examples, modification module 108 may modify network security policy 122 for network segment 204 by creating modified network security policy 216 to block endpoint computing device 206(1) and/or restrict network traffic. In these examples, the pairing between network traffic protection system 208 and endpoint computing device 206(1) may terminate due to the suspicious transmission of network packet 212. Additionally or alternatively, modification module 108 may add endpoint computing device 206(1) to a blacklist of devices. In these examples, the blacklist of devices may be used by multiple network computing devices to prevent suspicious transmission of network packets by endpoint computing device 206(1) on multiple network segments. In further examples, modification module 108 may prevent the suspicious transmission of network packet 212 from completing in real-time after intercepting network packet 212 for analysis. In these examples, network traffic protection system 208 may review all network traffic before allowing it to proceed.

Returning to FIG. 3, at step 308, one or more of the systems described herein may enforce, by the network traffic protection system, the modified network security policy for all endpoint computing devices connected to the network segment. For example, enforcement module 110 may, as part of network computing device 202 in FIG. 2, enforce, by network traffic protection system 208, a modified network security policy 216 for all endpoint computing devices connected to network segment 204.

Enforcement module 110 may enforce modified network security policy 216 in a variety of ways. In one embodiment, enforcement module 110 may enforce modified network security policy 216 by pushing modified network security policy 216 to endpoint computing devices 206(1) and/or 206(2). The term "push," as used herein, generally refers to a method of transmitting content or data in which the sender initiates the process. For example, enforcement module 110 may send an updated blacklist of endpoint computing devices to endpoint computing devices 206(1) and/or 206(2). Additionally or alternatively, enforcement module 110 may ensure network traffic follows modified network security policy 216 and/or restrict a non-compliant endpoint computing device, such as endpoint computing device 206

(1). For example, endpoint computing device 206(1) may not accept modified network security policy 216, and enforcement module 110 may subsequently restrict traffic from endpoint computing device 206(1). Furthermore, in these embodiments, network traffic protection system 208 may continue to monitor network traffic and network packets for network segment 204 based on modified network security policy 216.

In some examples, the systems described herein may further include sending modified network security policy 216 to a related network traffic protection system that monitors a related network segment. For example, modified network security policy 216 may include a blacklist of endpoint devices determined to be threats, and network traffic protection system 208 may send the blacklist to other network traffic protection systems that may improve security by blocking the endpoint devices. In these examples, the related network segment may include a second network segment within a cluster of network segments containing network segment 204. Thus, the systems described herein may propagate real-time changes to network security policy 122 by enforcing modified network security policy 216 for a cluster of network segments.

Figure 4:
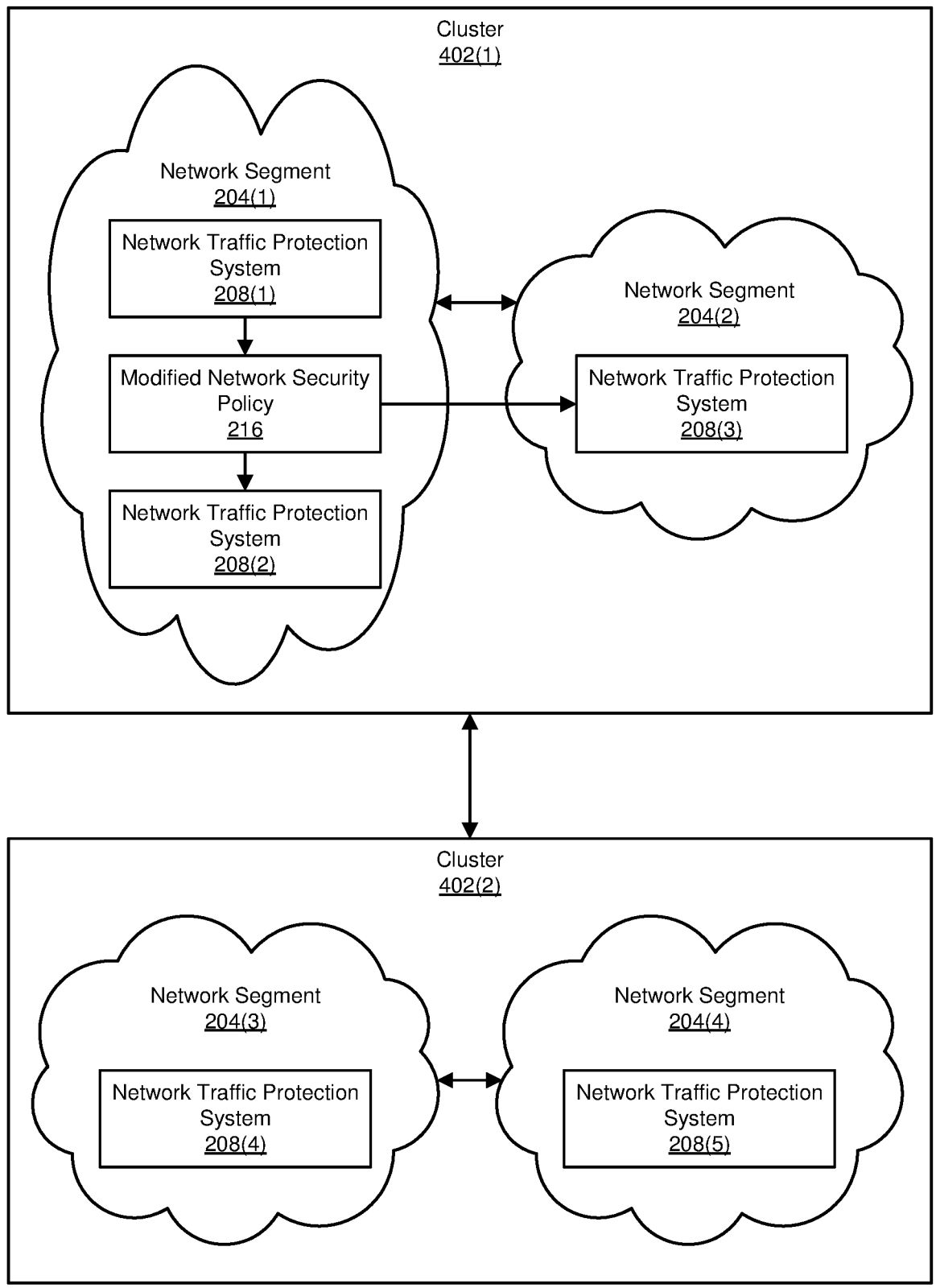
FIG. 4 is a block diagram of an example propagation of a modified network security policy in an example cluster of network segments.

As illustrated in FIG. 4, a network traffic protection system 208(1) on a network segment 204(1) may send modified network security policy 216 to another network traffic protection system 208(2) on network segment 204(1) and a network traffic protection system 208(3) on a related network segment 204(2) within a cluster 402(1). Additionally, network traffic protection systems on a second cluster 402(2) (e.g., a network traffic protection system 208(4) and a network traffic protection system 208(5)) may not receive modified network security policy 216. In this example, cluster 402(1) may represent network segments for a financial department within a company network while cluster 402(2) may represent network segments for a customer service department. Modified network security policy 216 may include increase security for financial transactions, which may apply to network segments in cluster 402(1) but not cluster 402(2) (e.g., a network segment 204(3) and a network segment 204(4)). Thus, network traffic protection system 208(1) may only send modified network security policy 216 to network traffic protection systems for which modified network security policy 216 applies. In another example, clusters may represent networks for different organizations, and network traffic protection system 208(1) may only be able to communicate with other network traffic protection systems in the same organization. Thus, modified network security policy 216 may propagate across network segments based on a hierarchy of clusters.

In one embodiment, the systems described herein may further include identifying one or more software applications related to the suspicious transmission of network packet 212, requesting additional information about the software application from endpoint computing device 206, and performing a security action based on the additional information. The term "software application," as used herein, generally refers to a software program designed to perform specific functions or tasks and capable of being installed, deployed, executed, and/or otherwise implemented on an endpoint device. Notably, a software application may be able to request and/or transmit data over a network connection.

In the above embodiment, the security action may include detecting user tampering of endpoint computing device 206, detecting an anomaly in installation of the software application, determining the software application may be malicious, requesting a log of user activity for the software application, and/or restricting endpoint computing device 206, such as blocking network traffic on network segment 204. In these embodiments, the suspicious transmission of network packet 212 may indicate incorrect installation of the software application and/or non-compliance caused by user tampering.

Figure 5:
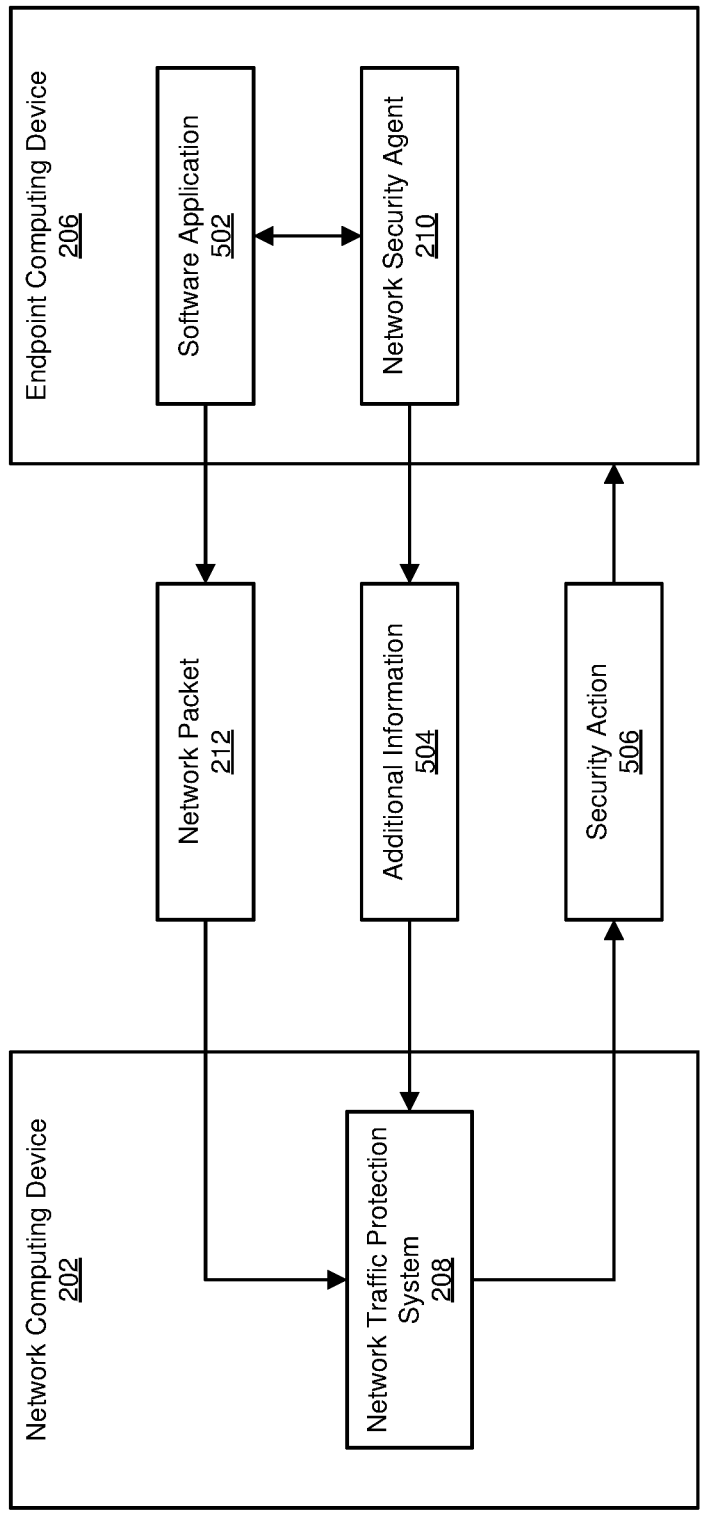
FIG. 5 is a block diagram of an example security action performed in response to detecting an example software application on an example endpoint computing device.

As illustrated in FIG. 5, endpoint computing device 206 may include a software application 502, which may send network packet 212. Network traffic protection system 208 on network computing device 202 may then intercept network packet 212 and request additional information 504 about software application 502 from network security agent 210 on endpoint computing device 206. Network traffic protection system 208 may then perform a security action 506 based on additional information 504. For example, network traffic protection system 208 may determine that additional information 504 suggests software application 502 was incorrectly installed and perform security action 506 to request a new installation of software application 502. As another example, network traffic protection system 208 may determine that software application 502 is a potential security threat and, subsequently, perform security action 506 to block endpoint computing device 206 from transmitting network packets from software application 502. Alternatively, network security agent 210 may send additional information 504 that includes a log of user actions suggesting user tampering of software application 502. Security action 506 may then include alerting an administrator about the actions of the user to request future compliance. In this example, the administrator may be a supervisor of the user and may require alerts about non-compliant actions by the user.

In another example, network traffic protection system 208 may determine, based on network traffic of software applications on endpoint computing device 206, that expected network traffic for software application 502 is missing. In this example, network traffic protection system 208 may compare network traffic to expected network traffic profile 214 of FIG. 2 to detect non-compliance for software application 502 on endpoint computing device 206. By requesting additional information 504 and identifying a software application associated with each network packet of endpoint computing device 206, network traffic protection system 208 may then identify one or more software applications for which network traffic is missing or suspicious and perform the appropriate security action to remediate the suspicious traffic. For example, an employee endpoint computing device may be required by a company to run certain software applications, and missing network traffic may indicate missing or incorrect configurations of software applications.

In some embodiments, as in the example of FIG. 6, the systems described herein may further include detecting, by network security agent 210, a disconnect from network 602 and reapplying original set of security policies 608 for endpoint computing device 206. In these embodiments, endpoint computing device 206 may revert to previous security policies after disconnecting from network 602 and/or accepting a new set of network security policies when transferring to a new network or network segment. For example, endpoint computing device 206 may disconnect from network segment 204(1) in FIG. 4 and connect to network segment 204(3) when moving from financial cluster 402(1) to customer service cluster 402(2) in the organization. In this example, endpoint computing device 206 may then accept the security policies of customer service cluster 402(2) and relinquish the security policies of financial cluster 402(1), which no longer apply.

As detailed above, the systems described herein may generally include one or more endpoint computing devices that are configured to detect, by network security agents running on the endpoint computing devices, attempts by the endpoint computing devices to connect to a network or network segment. For example, an endpoint computing device that attempts to connect to a network segment may then attempt, by the network security agent running on the endpoint computing device, to pair with a network traffic protection system managing the network segment and may receive, based on the attempt to pair with the network traffic protection system, a set of network security policies for the network segment. In this example, the endpoint computing device may modify an original set of security policies for the endpoint computing device to comply with the received set of network security policies for the network segment. If the network security agent is able to pair and comply with the network traffic protection system, the endpoint computing device may be enabled to complete the attempt to connect to the network segment. Multiple endpoint computing devices may pair with the same network traffic protection system while connected to the network segment.

In the above example, a network computing device may run the network traffic protection system and may be configured to monitor, by the network traffic protection system, network packets transmitted on the network segment. The network computing device may detect, by the network traffic protection system, a suspicious transmission of one or more network packets associated with the above endpoint computing device connected to the network segment and modify one or more network security policies for the network segment based on the suspicious transmission. In this example, the network computing device may then enforce the modified network security policy for all endpoint computing devices connected to the network segment to ensure compliance with the modified network security policy. The network computing device may also send, via the network traffic protection system, the modified network security policy to other network traffic protection systems on the same network segment or a related network segment within a cluster to ensure compliance throughout a cluster of network segments. Additionally, in the above example, the network computing device may request additional information about a software application that may generate the suspicious network packet from the endpoint computing device and use the additional information to perform a security action on the endpoint computing device. In these examples, the network traffic protection system may manage traffic on the network segment and dynamically adjust network security policies based on detecting potentially malicious traffic due to connected endpoint devices.

As explained above in connection with method 300 in FIG. 3 and method 800 in FIG. 8, the disclosed systems and methods may, by enforcing network security policies for endpoint devices, improve both endpoint and network security. Specifically, the disclosed systems and methods may pair network security agents running on endpoint computing devices with network traffic protection systems running on network computing devices to ensure network traffic compliance for a network or network segment.

By pairing with a trusted network traffic protection system, the systems and methods described herein may enable an endpoint computing device to offload some network security functions from its network security agent to the network traffic protection system. For example, if a public coffee shop network runs trusted network traffic protection system software with which the network security agent can mutually authenticate, the endpoint computing device may be more likely to trust the network than another network that does not run a network traffic protection system. In addition, by maintaining network-specific security policies only while connected to the particular network, the disclosed systems and methods may then free resources on an endpoint computing device, after the device leaves the network, to streamline performance.

In some examples, the systems and methods described herein may also enable a network computing device to monitor network traffic for endpoint computing devices and detect anomalous traffic. For example, if the network traffic protection system running on the network computing device detects that an endpoint computing device is compromised with suspicious network traffic, it may update a network policy to block that endpoint computing device and enforce the updated policy on other endpoint computing devices connected to the network segment, such that the other endpoint computing devices receive timely updates to security information on the network segment. The disclosed systems and methods may also specifically request additional information about a software that may be compromised, based on the suspicious network traffic, from the network security agent on the compromised endpoint computing device. In this example, the disclosed systems and methods may detect software compliance issues without requiring configuration information or registry access for the compromised endpoint computing device. Additionally, the systems and methods described herein may create and propagate a hierarchy of network security policies based on network types for different network segments and clusters. For example, the disclosed systems and methods may send security policy updates from one network traffic protection system on a financial network segment to another network traffic protection system on another financial network segment but not to network segments of other, unrelated departments within the organization.

As detailed above, by accepting local network security policies from network traffic protection systems on networks and network segments, the disclosed systems and methods may provide more dynamic adjustment of security policies for an endpoint computing device as it switches from one network to another. Furthermore, by pushing changes to security policies from a network traffic protection system to endpoint computing devices in real-time, the disclosed systems and methods may improve the timeliness of enforcing security updates for a network. Thus, the systems and methods described herein may improve the provisioning of network security policies to endpoint devices without administrative intervention.

Figure 9:
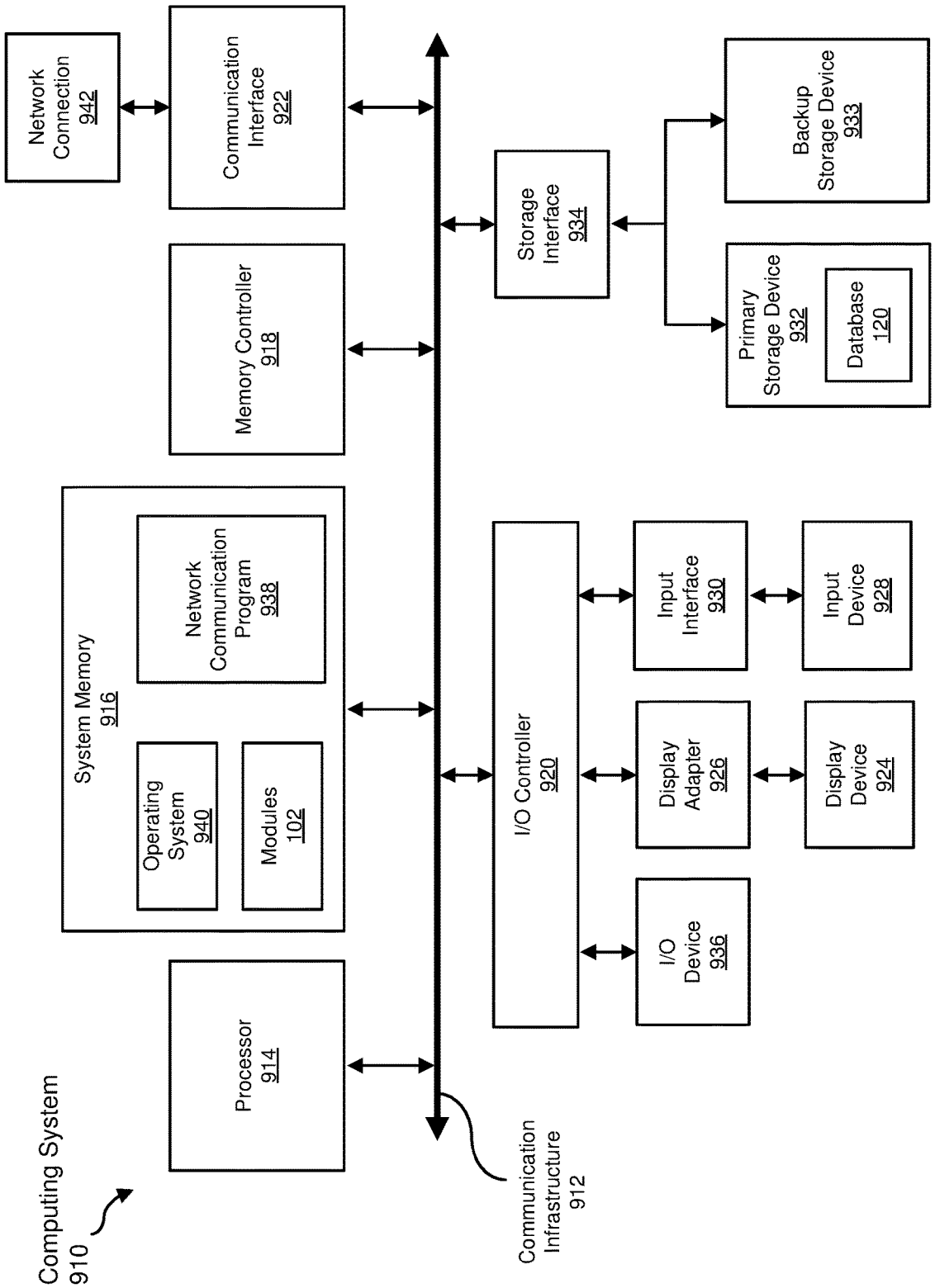
FIG. 9 is a block diagram of an example computing system capable of implementing one or more of the embodiments described and/or illustrated herein.

FIG. 9 is a block diagram of an example computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3 and/or FIG. 8). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the example embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In some examples, system memory 916 may store and/or load an operating system 924 for execution by processor 914. In one example, operating system 924 may include and/or represent software that manages computer hardware and software resources and/or provides common services to computer programs and/or applications on computing system 910. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

As illustrated in FIG. 9, computing system 910 may also include at least one display device 924 coupled to I/O controller 920 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, example computing system 910 may also include at least one input device 928 coupled to I/O controller 920 via an input interface 930. Input device 928 generally represents any type or form of input device capable of providing input, either computer or human generated, to example computing system 910. Examples of input device 928 include, without limitation, a keyboard, a pointing device, a speech recognition device, variations or combinations of one or more of the same, and/or any other input device.

Additionally or alternatively, example computing system 910 may include additional I/O devices. For example, example computing system 910 may include I/O device 936. In this example, I/O device 936 may include and/or represent a user interface that facilitates human interaction with computing system 910. Examples of I/O device 936 include, without limitation, a computer mouse, a keyboard, a monitor, a printer, a modem, a camera, a scanner, a microphone, a touchscreen device, variations or combinations of one or more of the same, and/or any other I/O device.

Communication interface 922 broadly represents any type or form of communication device or adapter capable of facilitating communication between example computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

In some examples, system memory 916 may store and/or load a network communication program 938 for execution by processor 914. In one example, network communication program 938 may include and/or represent software that enables computing system 910 to establish a network connection 942 with another computing system (not illustrated in FIG. 9) and/or communicate with the other computing system by way of communication interface 922. In this example, network communication program 938 may direct the flow of outgoing traffic that is sent to the other computing system via network connection 942. Additionally or alternatively, network communication program 938 may direct the processing of incoming traffic that is received from the other computing system via network connection 942 in connection with processor 914.

Although not illustrated in this way in FIG. 9, network communication program 938 may alternatively be stored and/or loaded in communication interface 922. For example, network communication program 938 may include and/or represent at least a portion of software and/or firmware that is executed by a processor and/or Application-Specific Integrated Circuit (ASIC) incorporated in communication interface 922.

As illustrated in FIG. 9, example computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, database 120 from FIG. 1 may be stored and/or loaded in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 910 may be configured as an ASIC adapted to implement one or more of the example embodiments disclosed herein.

Figure 10:
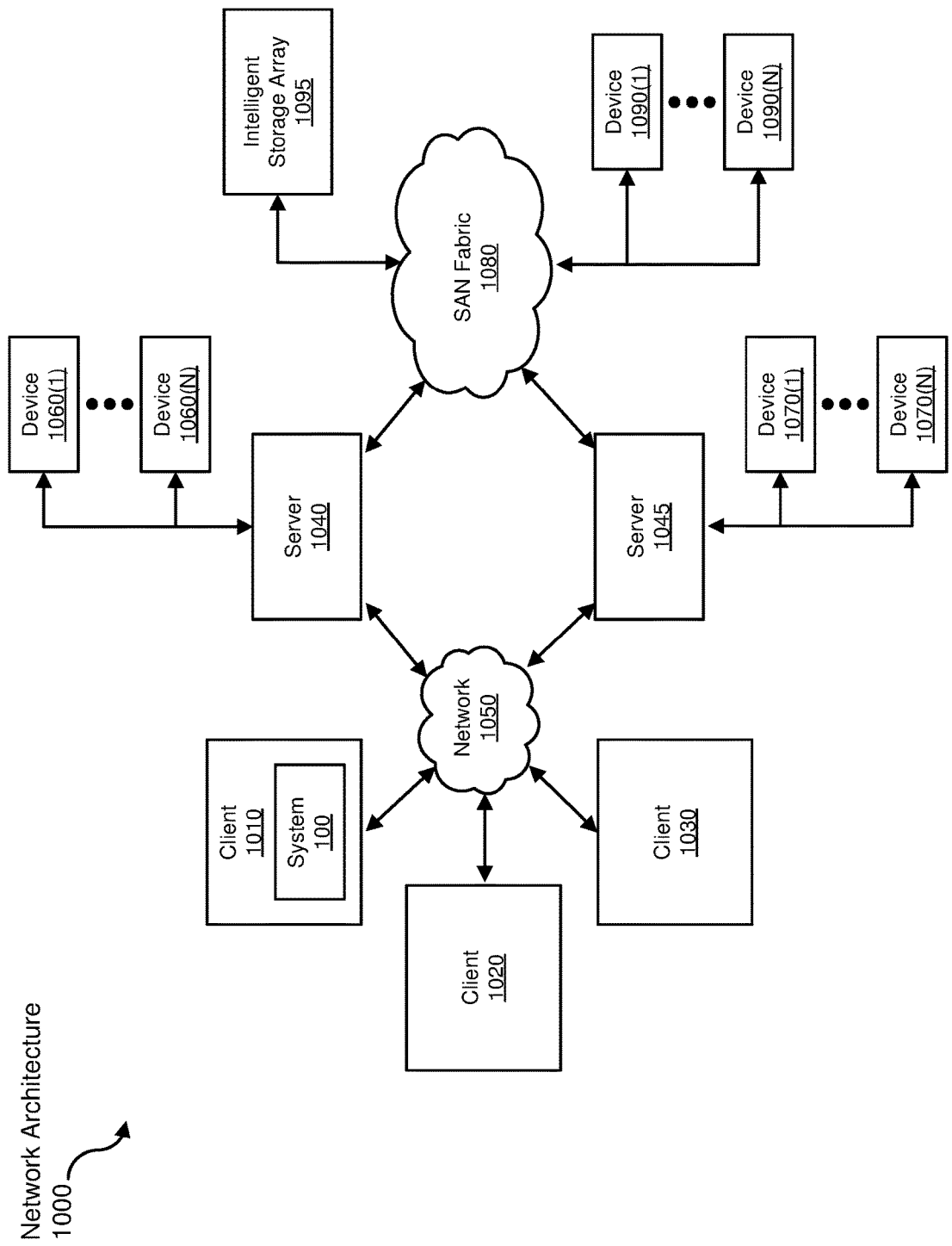
FIG. 10 is a block diagram of an example computing network capable of implementing one or more of the embodiments described and/or illustrated herein.

FIG. 10 is a block diagram of an example network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3 and/or FIG. 8). All or a portion of network architecture 1000 may also be used to perform and/or be a means for performing other steps and features set forth in the instant disclosure.

Client systems 1010, 1020, and 1030 generally represent any type or form of computing device or system, such as example computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to example computing system 1010 of FIG. 10, a communication interface, such as communication interface 1022 in FIG. 10, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the example embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an example method for enforcing dynamic network security policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a network packet to be transformed, transform the network packet, output a result of the transformation to a storage or output device, use the result of the transformation to identify suspicious network traffic, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing dynamic network security policies, at least a portion of the method being performed by a network computing device comprising at least one processor, the method comprising:
   monitoring, by a network traffic protection system, network packets transmitted to and from endpoint computing devices on a network segment;
   detecting, by the network traffic protection system, a suspicious transmission of at least one network packet to or from an endpoint computing device connected to the network segment;
   modifying, based on the suspicious transmission of the network packet, at least one network security policy for the network segment; and
   enforcing, by the network traffic protection system, the modified network security policy for all endpoint computing devices connected to the network segment by pushing the modified network security policy to a network security agent that is running on each endpoint computing device, wherein the network security agent:
      is paired to the network traffic protection system; and
      modifies an original set of security policies for the endpoint computing device to comply with the modified network security policy.

2. The method of claim 1, wherein the endpoint computing device comprises a computing device running software capable of pairing with the network traffic protection system while connected to the network segment.

3. The method of claim 1, wherein detecting the suspicious transmission of the network packet comprises:
   intercepting the network packet; and
   determining, based on an expected network traffic profile of the endpoint computing device, that the transmission of the network packet is suspicious.

4. The method of claim 1, wherein modifying the network security policy for the network segment comprises at least one of:
   blocking the endpoint computing device;
   restricting network traffic;
   adding the endpoint computing device to a blacklist of devices; and
   preventing the suspicious transmission of the network packet from completing.

5. The method of claim 1, wherein enforcing the modified network security policy comprises at least one of:
   ensuring network traffic follows the modified network security policy; and restricting a non-compliant endpoint computing device connected to the network segment.

6. The method of claim 1, further comprising sending the modified network security policy to a related network traffic protection system that monitors a related network segment.

7. The method of claim 6, wherein the related network segment comprises a second network segment within a cluster of network segments containing the network segment.

8. The method of claim 1, further comprising:
identifying at least one software application related to the suspicious transmission of the network packet;
requesting additional information about the software application from the endpoint computing device; and
performing a security action based on the additional information.

9. The method of claim 8, wherein the security action comprises at least one of:
detecting user tampering of the endpoint computing device;
detecting an anomaly in installation of the software application;
determining the software application may be malicious;
requesting a log of user activity for the software application; and
restricting the endpoint computing device.

10. A system for enforcing dynamic network security policies, the system comprising:
a monitoring module, stored in memory, that monitors, by a network traffic protection system, network packets transmitted to and from endpoint computing devices on a network segment;
a detection module, stored in memory, that detects, by the network traffic protection system, a suspicious transmission of at least one network packet to or from an endpoint computing device connected to the network segment;
a modification module, stored in memory, that modifies, based on the suspicious transmission of the network packet, at least one network security policy for the network segment;
an enforcement module, stored in memory, that enforces, by the network traffic protection system, the modified network security policy for all endpoint computing devices connected to the network segment by pushing the modified network security policy to a network security agent that is running on each endpoint computing device, wherein the network security agent:
is paired to the network traffic protection system; and
modifies an original set of security policies for the endpoint computing device to comply with the modified network security policy; and
at least one processor that executes the monitoring module, the detection module, the modification module, and the enforcement module.

11. The system of claim 10, wherein the endpoint computing device comprises a computing device running software capable of pairing with the network traffic protection system while connected to the network segment.

12. The system of claim 10, wherein the detection module detects the suspicious transmission of the network packet by:
intercepting the network packet; and
determining, based on an expected network traffic profile of the endpoint computing device, that the transmission of the network packet is suspicious.

13. The system of claim 10, wherein the modification module modifies the network security policy for the network segment by at least one of:
blocking the endpoint computing device;
restricting network traffic;
adding the endpoint computing device to a blacklist of devices; and
preventing the suspicious transmission of the network packet from completing.

14. The system of claim 10, wherein the enforcement module enforces the modified network security policy by at least one of:
ensuring network traffic follows the modified network security policy; and
restricting a non-compliant endpoint computing device connected to the network segment.

15. The system of claim 10, further comprising sending the modified network security policy to a related network traffic protection system that monitors a related network segment.

16. The system of claim 15, wherein the related network segment comprises a second network segment within a cluster of network segments containing the network segment.

17. The system of claim 10, further comprising:
identifying at least one software application related to the suspicious transmission of the network packet;
requesting additional information about the software application from the endpoint computing device; and
performing a security action based on the additional information.

18. The system of claim 17, wherein the security action comprises at least one of:
detecting user tampering of the endpoint computing device;
detecting an anomaly in installation of the software application;
determining the software application may be malicious;
requesting a log of user activity for the software application; and
restricting the endpoint computing device.

19. A non-transitory computer-readable medium comprising one or more computer-executable instructions that, when executed by at least one processor of a network computing device, cause the network computing device to:
monitor, by a network traffic protection system, network packets transmitted to and from endpoint computing devices on a network segment;
detect, by the network traffic protection system, a suspicious transmission of at least one network packet to or from an endpoint computing device connected to the network segment;
modify, based on the suspicious transmission of the network packet, at least one network security policy for the network segment; and
enforce, by the network traffic protection system, the modified network security policy for all endpoint computing devices connected to the network segment by pushing the modified network security policy to a network security agent that is running on each endpoint computing device, wherein the network security agent:
is paired to the network traffic protection system; and
modifies an original set of security policies for the endpoint computing device to comply with the modified network security policy.

20. The non-transitory computer-readable medium of claim 19, wherein the endpoint computing device comprises a computing device running software capable of pairing with the network traffic protection system while connected to the network segment.

* * * * *